(12) United States Patent
Chen

(10) Patent No.: US 6,672,834 B2
(45) Date of Patent: Jan. 6, 2004

(54) REMOVABLE PROPELLER ASSEMBLY INCORPORATING BREAKAWAY ELEMENTS

(75) Inventor: Liheng Chen, Schaumburg, IL (US)

(73) Assignee: Turning Point Propellers, Inc., Elk Grove Village, IL (US)

( * ) Notice: Subject to any disclaimer, the term of this patent is extended or adjusted under 35 U.S.C. 154(b) by 51 days.

(21) Appl. No.: 10/037,644

(22) Filed: Dec. 21, 2001

(65) Prior Publication Data

US 2003/0118443 A1 Jun. 26, 2003

(51) Int. Cl.[7] ................................................ B63H 1/20
(52) U.S. Cl. ...................... 416/2; 416/134 R; 416/93 A; 416/204 R
(58) Field of Search .................................. 416/2, 134 R, 416/93 A, 204 R, 245 A, 244 B

(56) References Cited

U.S. PATENT DOCUMENTS

| | | | | |
|---|---|---|---|---|
| 5,049,034 A | * | 9/1991 | Cahoon | 416/134 R |
| 5,201,679 A | * | 4/1993 | Velte, Jr. et al. | 440/49 |
| 5,244,348 A | * | 9/1993 | Karls et al. | 416/204 R |
| 5,252,028 A | * | 10/1993 | LoBosco et al. | 416/93 A |
| 5,484,264 A | * | 1/1996 | Karls et al. | 416/204 R |
| 5,527,153 A | * | 6/1996 | Bernhardt | 416/46 |
| 5,810,561 A | * | 9/1998 | Cossette | 416/43 |
| 5,908,284 A | * | 6/1999 | Lin | 416/134 R |
| 5,967,751 A | * | 10/1999 | Chen | 416/134 R |
| 6,358,008 B1 | * | 3/2002 | Chen | 416/134 R |
| 6,383,042 B1 | * | 5/2002 | Neisen | 440/49 |
| 6,471,481 B2 | * | 10/2002 | Chen | 416/134 R |
| 6,478,543 B1 | * | 11/2002 | Tuchscherer et al. | 416/134 R |
| 6,524,069 B2 | * | 2/2003 | Chen | 416/134 R |

* cited by examiner

Primary Examiner—Edward K. Look
Assistant Examiner—J. M. McAleenan
(74) Attorney, Agent, or Firm—Boyle Fredrickson Newholm Stein & Gratz S.C.

(57) ABSTRACT

A propeller assembly is provided for mounting on a rotatable propeller shaft of a marine vehicle. The propeller assembly includes a central adaptor mounted on the propeller shaft for rotational movement therewith. A tubular propeller housing is slidable over the central adaptor. A bushing assembly translates rotation of the central adaptor to the propeller housing. A breakaway element is provided for interconnecting in a central adaptor and the bushing assembly. The breakaway allows the central adaptor to rotate independent of the propeller housing in response to the predetermined force thereon.

20 Claims, 2 Drawing Sheets

REMOVABLE PROPELLER ASSEMBLY INCORPORATING BREAKAWAY ELEMENTS

FIELD OF THE INVENTION

This invention relates to propeller assemblies, and in particular, to a propeller assembly for a marine vehicle which incorporates a central hub having breakaway elements to prevent damage to drive system and the engine of the marine vehicle.

BACKGROUND AND SUMMARY OF THE INVENTION

It is known to propel a marine vehicle utilizing a propeller assembly mounted on a rotatable drive shaft. The propeller assembly includes a plurality of propeller blades extending radially from a central hub. A motor rotates the drive shaft that, in turn, rotates the propeller blades propelling the marine vehicle through the water. Typically, the propeller assembly is constructed as a unit wherein the propeller blades and the central hub are mounted or removed from the drive shaft in unison. Alternatively, in order to reduce the time and costs associated with replacing the propeller blades, it has been contemplated to provide a propeller assembly for a marine engine wherein the propeller blades project from a propeller housing that is removable from a central hub.

By way of example, Chen, U.S. Pat. No. 5,967,751 discloses a marine propeller assembly that includes a central hub secured to the propeller shaft and having three or more axially extending keys on the outer surface thereof. A propeller housing includes an inner surface having three or more pairs of lobes for forming keyways that receive the keys of the central hub. A retainer disc is threaded on a propeller shaft and includes a plurality of angularly spaced ears for engaging with the lobes on the inner surface on the propeller housing in order to prevent the propeller housing from being disengaged from the central hub While the advantages of a removal propeller housing are readily apparent, it can be appreciated that it is often highly desirable to retain the propeller assembly on the propeller shaft in such a manner as to prevent any unnecessary movement of the propeller assembly that may reduce the overall efficiency of the drive system of the marine vehicle. However, during such circumstances when the propeller blades engage a fixed object in the water such as a rock or the like, it may become necessary for the drive shaft of the marine vehicle to become disengaged from the propeller housing in order to prevent damage to the drive system of the marine vehicle. Consequently, it is highly desirable to provide a propeller assembly that disengages from the drive shaft in response to a predetermined force thereon.

Therefore, it is a primary object and feature of the present invention to provide a propeller assembly that may be simply and easily mounted on and removed from the drive shaft of a marine vehicle.

It is still a further object and feature of the present invention to provide a propeller assembly that may be mounted on the propeller shaft of a marine vehicle in such a manner as to prevent any unnecessary movement of the propeller assembly that may reduce the overall efficiency of the drive system of the marine vehicle.

It is still a further object and feature of the present invention to provide a propeller assembly that disengages from the drive shaft of the marine vehicle in response to a predetermined force on the propeller assembly.

In accordance with the present invention, a propeller assembly is provided for mounting on a rotatable propeller shaft of a watercraft. The propeller shaft extends along an axis and terminates at a threaded end. The propeller assembly includes a central adaptor mountable on the propeller shaft for rotational movement therewith. The central adaptor defines a generally cylindrical outer surface having a plurality of circumferentially spaced recesses therealong. A generally tubular housing is slidable over the central adaptor. The propeller housing includes an inner surface and an outer surface. The bushing assembly translates rotational movement of the central adaptor to the propeller housing. The bushing assembly includes a bushing and an insert. The bushing has an outer surface which engages the inner surface of the propeller housing an inner surface having a plurality of circumferentially spaced, axially extending recesses therein. The insert also has inner and outer surfaces. The outer surface of the insert includes a plurality of circumferentially spaced, axially extending keys projecting radially outward therefrom. The keys projecting from the outer surface of the insert are receivable within corresponding recesses in the inner surface of the bushing. The inner surface of the insert includes a plurality of circumferentially spaced, axially extending keys projecting radially inward therefrom. The keys projecting of the inner surface of the insert are receivable within corresponding recesses and the outer surface of the central adaptor. A locking structure is mountable on the propeller shaft for retaining the propeller assembly on the propeller shaft.

The central adaptor may include an enlarge head formed on the first end thereof. The inner surface of the propeller housing includes a ledge formed therein. The enlarged head of the central adaptor includes a cavity therein. The cavity receives the locking structure when mounted on the propeller shaft. It is contemplated that a first side of a washer engage the ledge and a second side of the washer engage the enlarged head of the second adaptor in order to prevent removal of the propeller housing from the central adaptor. Alternatively, a first washer is positioned about the propeller shaft and is interconnected to the propeller housing at a first location adjacent the first end of the bushing assembly. A second washer is positionable about the propeller shaft at a second location adjacent the second end of the bushing assembly so as to capture the bushing assembly between the first and second washers.

Each key projects radially inward from the inner surface of the insert and disengages from the insert in response to a predetermined force thereon. As is conventional, the propeller housing includes a plurality of circumferentially spaced propeller blades extending from the outer surface thereof.

In accordance with a further aspect of the present invention, a propeller assembly is provided for mounting on a rotatable propeller shaft of a watercraft. The propeller shaft extends along an axis and terminates at a threaded end. The propeller assembly includes a central adaptor mountable on a propeller shaft for rotational movement therewith. The central adaptor defines an outer surface having a plurality of circumferentially spaced recesses therealong. A generally tubular propeller housing is slidable over the central adaptor. The propeller housing includes an inner surface. A bushing assembly translates rotational movement of the central adaptor to the propeller housing. The bushing assembly includes a bushing and an insert. The bushing has an outer surface engaging the inner surface of the propeller housing and an inner surface having a plurality of circumferentially spaced recesses therealong. The insert has a plurality of circumferentially spaced keys projecting from the outer surface thereof and into corresponding recesses in the inner surface of the bushing. In addition, the insert includes a plurality of circumferentially spaced keys projecting from an inner surface thereof into corresponding recesses in the outer surface of the central adaptor. A first washer is positionable about the propeller shaft and is interconnected to a propeller housing at a first location adjacent the first end of the bushing assembly. A second washer is positionable about the propeller shaft at a second location adjacent the second end of the bushing assembly so as to capture the bushing assembly between the first and second washers.

The propeller assembly further includes a locking element mounted on a propeller shaft for retaining the propeller assembly on the propeller shaft. The central adaptor includes an enlarged head defining a cavity therein. The cavity receives the locking element mounted on the propeller shaft therein.

The inner surface of the propeller housing includes a ledge formed therein. The second washer is positioned between the ledge and the enlarged head of the central adaptor. As is conventional, the propeller housing includes an outer surface having a plurality of circumferentially spaced propeller blades extending therefrom. It is contemplated that each key projecting from the inner surface of the insert breakaway from the insert in response to the predetermined force thereon so as to allow the central adaptor to rotate independent of the propeller housing.

A propeller housing is provided for mounting on a rotatable propeller shaft of a watercraft. The propeller shaft extends along an axis and terminates at a threaded end. The propeller assembly includes a central adaptor mountable on the propeller shaft for rotational movement therewith. A tubular propeller housing is slidable over the central adaptor. The propeller housing includes an inner surface. A bushing assembly translates rotation of movement of the central adaptor to the propeller housing. The bushing assembly includes a bushing and an insert. The bushing has an outer surface that engages the inner surface of the propeller housing and an inner surface. The insert has an outer surface operatively connected to the inner surface of the bushing and an inner surface. A breakaway element interconnects the inner surface of the insert and the outer surface of the central adaptor. The breakaway element allows the central adaptor to rotate independent of the propeller housing in response to a predetermined force on the breakaway element.

The propeller assembly may include a locking element mountable on the propeller shaft for retaining the propeller assembly thereon. The central adaptor includes an enlarged head defining a cavity therein. The cavity receives the locking element mounted on the propeller shaft therein. The inner surface of the propeller housing includes the ledge formed therein. A washer may be positioned between the ledge and the enlarged head of the central adaptor.

As is conventional, the propeller housing includes an outer surface having a plurality of circumferentially spaced propeller blades extending therefrom. The breakaway element may include a frangeable key extending along the inner surface of the insert. The frangeable key fractures in response to a predetermined force thereon. The central adaptor may include a recess in the outer surface thereof. The frangeable key extends into the recess of the central adaptor.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
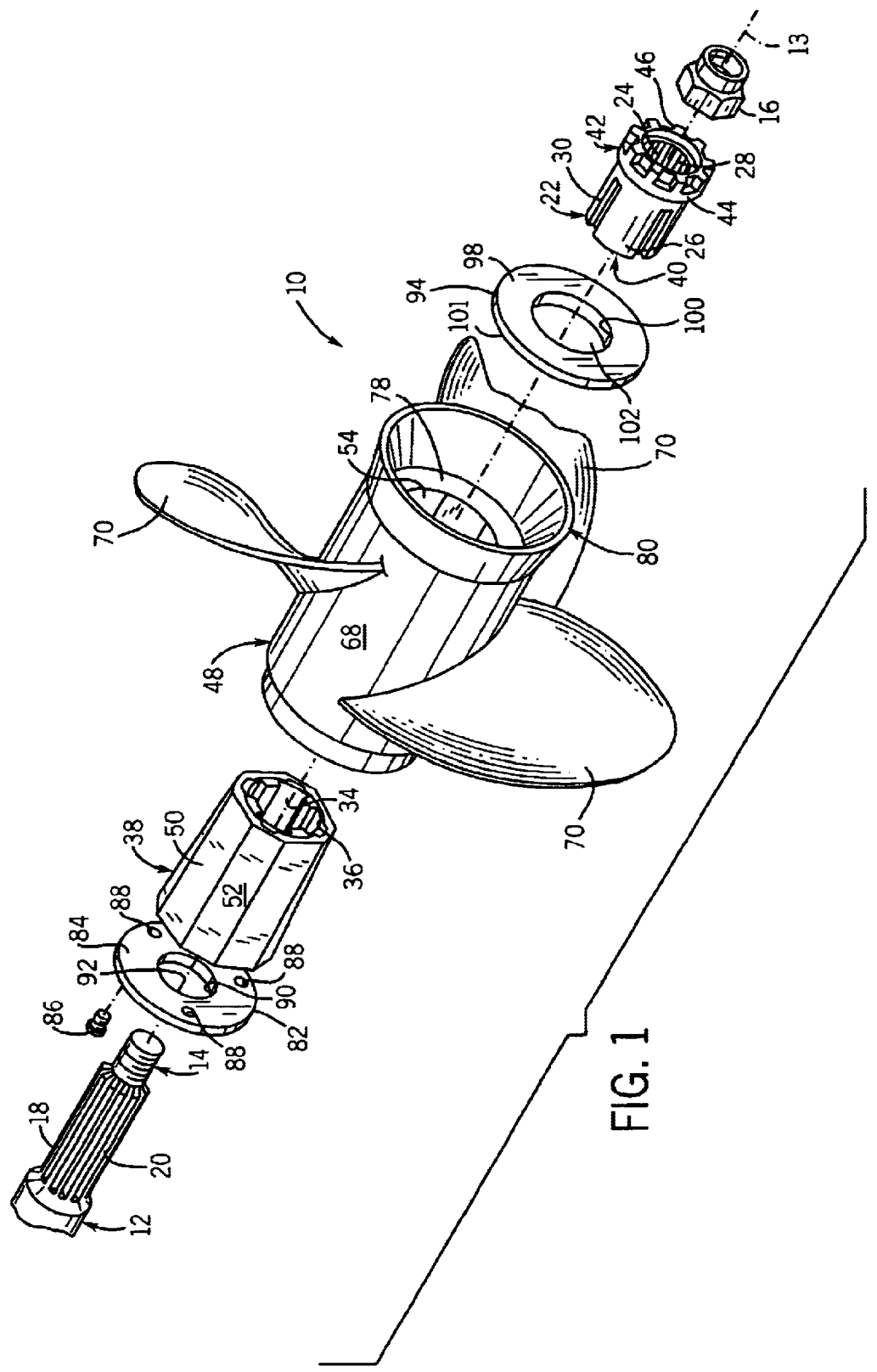
FIG. 1 is an exploded, isometric view of a propeller assembly in accordance with the present invention.

Referring to FIG. 1, a propeller assembly in accordance with the present invention is generally designated by the reference numeral 10. It is intended that propeller assembly 10 be mounted on a rotatable propeller shaft 12 that, in turn, is driven by a marine engine (not shown). Propeller shaft 12 extends along a longitudinal axis 13 and terminates at threaded terminal end 14 adapted for receiving locking nut 16 thereon, for reasons hereinafter described. As is conventional, rotatable shaft 12 includes an outer surface 18 having longitudinally extending splines 20 therealong adjacent terminal end 14.

Figure 2:
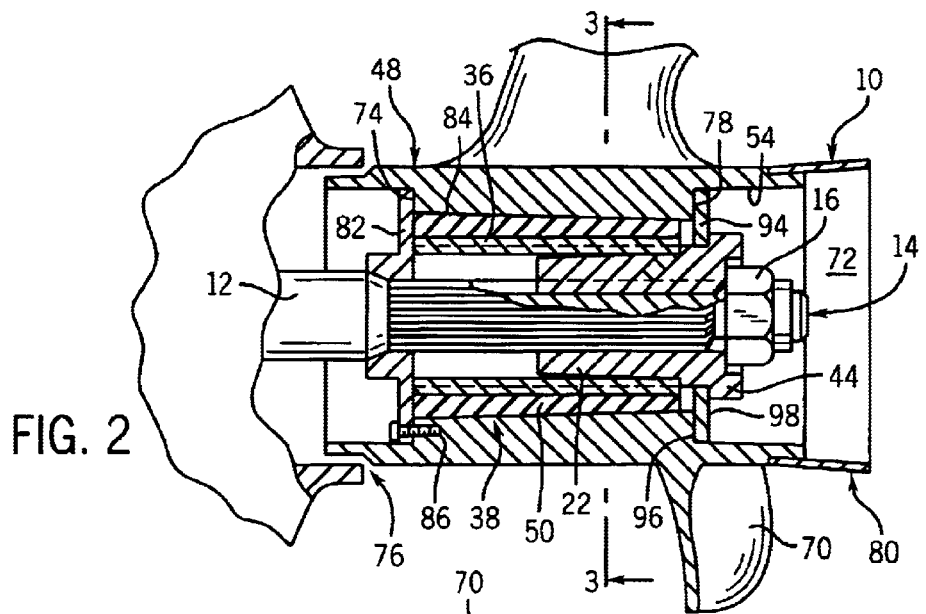
FIG. 2 is a side elevational view, with portions broken away, showing the propeller assembly of FIG. 1.
Figure 3:
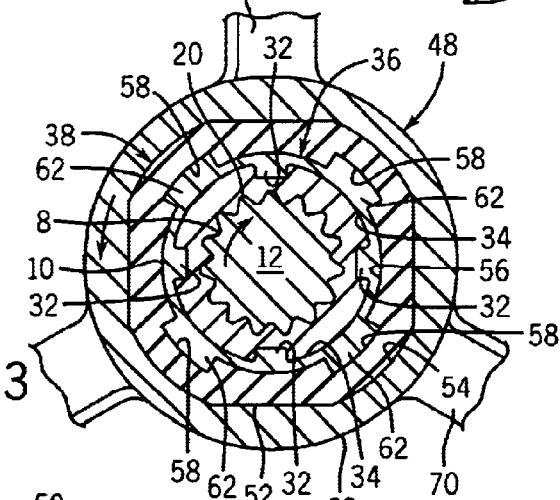
FIG. 3 is a cross-sectional view of the propeller assembly of the present invention taken along line 3—3 of FIG. 2.

Referring to FIGS. 1–2, propeller assembly 10 includes a central adaptor 22 having an inner surface 24 and a generally cylindrical outer surface 26. Inner surface 24 of central adaptor 22 includes longitudinally extending splines 28 extending therealong which mesh with splines 20 extending along propeller shaft 12 when propeller assembly 10 is mounted thereon. Outer surface 26 of central adaptor 22 includes a plurality of circumferentially spaced recesses 30 therealong for receiving corresponding keys 32 projecting radially inward from inner surface 34 of insert 36 of bushing assembly 38 for reasons hereinafter described. Central adaptor 22 further includes a first end 40 directed toward the marine vehicle on which propeller assembly 10 is to be mounted and a second opposite end 42 having an enlarged head 44 formed thereon which defines a cavity 46 for receiving locking nut 16 therein.

Propeller assembly 10 further includes bushing assembly 38 which is intended to translate rotation of central adaptor 22 to propeller housing 48. Bushing assembly 38 includes bushing 50 having an outer surface 52 engageable with the inner surface 54 of propeller housing 48. Bushing 50 further includes an inner surface 56 having a plurality of circumferentially spaced recesses 58 formed therein.

Figure 4A:
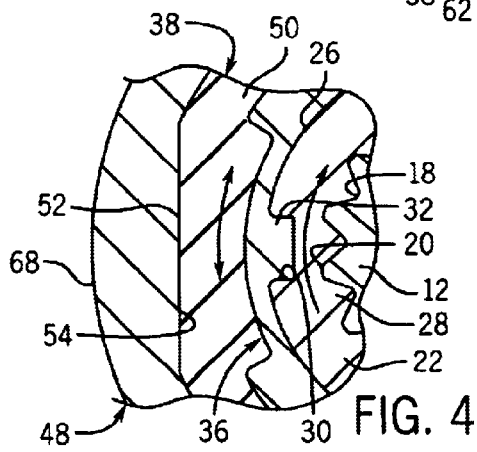
FIG. 4A is an enlarged, cross-sectional view of a portion of the propeller assembly of FIG. 3 showing the propeller assembly during the operation thereof.
Figure 4B:
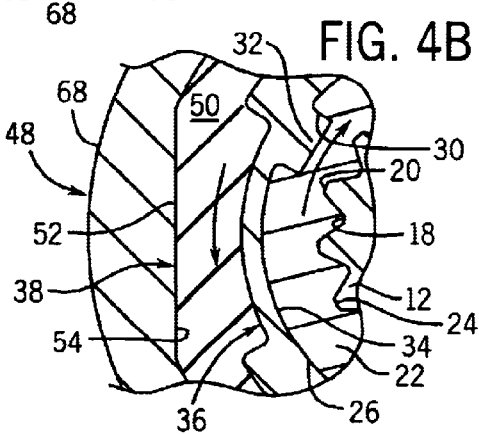
FIG. 4B is an enlarged, cross-sectional view of a portion of the propeller assembly of FIG. 3 showing the propeller assembly disengaged from the drive shaft of a marine vehicle on which the propeller assembly is mounted.

Bushing assembly 38 further includes insert 36 having an outer surface 60 engages inner surface 56 of bushing 50. A plurality of circumferentially spaced, longitudinally extending keys 62 project from outer surface 60 of insert 36. Keys 62 projecting from outer surface 60 of insert 36 are received within corresponding recesses 58 in inner surface 56 of bushing 50 in a mating relationship. As heretofore described, inner surface 34 of insert 36 includes a plurality of circumferentially spaced, longitudinally extending keys 32 projecting radially inward therefrom. Keys 32 projecting from inner surface 34 of insert 36 are receivable within corresponding recesses 30 in outer surface 26 of central adaptor 22. It is intended that keys 32 be frangible such that keys 32 disengage from inner surface 34 of insert 36 in response to a predetermined force thereon, FIG. 4b.

Propeller housing 48 of propeller assembly 10 includes an outer surface 68 having a plurality of circumferentially spaced propeller blades 70 projecting radially therefrom. Inner surface 54 of propeller housing 48 defines a bushing assembly receiving cavity 72 for receiving bushing assembly 38 and central adaptor 22, as hereinafter described. Inner surface 54 of propeller housing 48 includes a first, generally circular shoulder 74 formed therein adjacent a first end 76 thereof. In addition, inner surface 54 of propeller housing 48 includes a second, generally circular shoulder 78 formed therein at a location axially spaced from second end 80 of propeller housing 48.

In order to assemble a propeller assembly 10, bushing assembly 38 is inserted within cavity 72 of propeller housing 48 such that outer surface 52 of bushing 50 engages inner surface 54 of propeller housing 48 and such that bushing assembly 38 is positioned between first and second circular shoulders 74 and 78, respectively, provided by inner surface 54 of propeller housing 48. A generally circular washer 82 is inserted into first end 76 of propeller housing 48 such that the radially outer portion of first side 84 of washer 82 engages first circular shoulder 74. Washer 82 may take the form of a standard thrust washer which may be provided by the manufacturer of the marine engine. Alternatively, washer 82 may be interconnected to propeller housing 48 by a plurality of screws 86 that extend through corresponding openings 88 in washer 82 and into first circular shoulder 74 of propeller housing 48. It is noted that washer 82 includes a radially inner edge 90 which defines opening 92 for allowing terminal end 14 of propeller shaft 12 to pass therethrough, for reasons hereinafter described.

A second washer 94 is provided in cavity 72 within propeller housing 48 adjacent second end 80 thereof. Washer 94 includes first and second sides 96 and 98, respectively, a radially inner edge 100 which defines an opening 102 of sufficient dimension so as to allow first end 40 of central adaptor 22 to pass therethrough. It is intended that a radially outer portion of first side 96 of second washer 94 engage second shoulder 78 defined by inner surface 54 of propeller assembly 48 so as to capture bushing assembly 38 therebetween. As described, first end 40 of central adaptor 22 may be inserted through opening 102 in washer 94 such that recesses 30 in the outer surface 26 of central adaptor 22 form a mating relationship with keys 32 projecting from end surface 34 of insert 36 with pressure assembly 10 in its assembled configuration, second washer 94 is captured between shoulder 78 defined by inner surface 54 of propeller housing 48 and enlarged head 44 of central adaptor 22. Alternatively, washer 94 may be cast within cavity 72 of propeller housing 48 such that radially outer edge 101 of washer 94 is integral with inner surface 54 of propeller housing 48.

In order to mount the propeller assembly 10 on propeller shaft 12, terminal end 14 of propeller shaft 12 is axially inserted through opening 92 in first washer 82 and through central adaptor 22 such that splines 20 on outer surface 18 of propeller shaft 12 mesh with splines 28 along inner surface 24 of central adaptor 22 and such that terminal end 14 of propeller shaft 12 extends through cavity 46 defined by enlarged head 44 on second end 42 of central adaptor 22. Locking nut 16 is threaded onto terminal end 14 of propeller shaft 12 thereby securing propeller assembly 10 onto propeller shaft 12.

As is conventional, meshed splines 20 and 28 of propeller shaft 12 and central adaptor 22, respectively, translate rotation of propeller shaft 12 to central adaptor 22. Similarly, rotation of central adaptor 22 is translated to propeller housing 48 through bushing assembly 38 which, in turn, rotates the propeller blades 70 thereby propelling the marine vehicle, FIG. 4a. If propeller blades 70 become fixed due to engagement with an object in the water such that the propeller blades cannot rotate, it can be appreciated that the engine of the marine vehicle will continue to attempt to rotate propeller shaft 12. As a result, a rotational force will be exerted on keys 32 projecting from inner surface 34 of insert 36 by central adaptor 22 which rotates in unison with propeller shaft 12. If the force on keys 32 projecting from inner surface 34 of insert 36 exceeds a predetermined force, keys 32 fragment from inner surface 34 of insert 36, FIG. 4b. As a result, propeller shaft 12 and central adaptor 22 mounted thereon are free to rotate independent of bushing assembly 38 and propeller housing 48. In such manner, it is intended that damage to the engine and to the drive system of the marine vehicle is avoided.

Various modes of carrying out the invention are contemplated as being within the scope of the following claims particularly pointing out and distinctly claiming the subject matter that is regarded as the invention.

We claim:

1. A propeller assembly for mounting on a rotatable propeller shaft of a watercraft, the propeller shaft extending along an axis and terminating at a threaded end, comprising:
    a central adaptor mountable on the propeller shaft for rotational movement therewith, the central adaptor defining a generally cylindrical outer surface having a plurality of circumferentially spaced recesses therealong,
    a generally tubular propeller housing slidable over the central adaptor, the propeller housing including an inner surface and an outer surface;
    a bushing assembly for translating rotational movement of the central adaptor to the propeller housing, the bushing assembly including:
        a bushing having an outer surface engaging the inner surface of the propeller housing and an inner surface having a plurality of circumferentially spaced, axially extending recesses therein; and
        an insert having inner and outer surfaces, the outer surface including a plurality of circumferentially spaced, axially extending keys projecting radially outward therefrom and being receivable with corresponding recesses in the inner surface of the bushing and the inner surface of the insert including a plurality of circumferentially spaced, axially extending keys projecting radially inward therefrom for receipt within corresponding recesses in the outer surface of the central adaptor; and
    a locking structure mountable on the propeller shaft for retaining the propeller assembly on the propeller shaft.

2. The propeller assembly of claim 1 wherein the central adaptor includes an enlarged head formed on a first end thereof and wherein the inner surface of the propeller housing includes a ledge formed therein.

3. The propeller assembly of claim 2 wherein the enlarged head of the central adaptor includes a cavity therein, the cavity receiving the locking structure mounted on the propeller shaft.

4. The propeller assembly of claim 2 further comprising a washer having first and second sides, the first side of the washer engaging the ledge and the second side engaging enlarged head of the central adaptor for preventing removal of the propeller housing from the central adaptor.

5. The propeller assembly of claim 1 further comprising:
a first washer positionable about the propeller shaft and being interconnected to the propeller housing at a first location adjacent a first end of the bushing assembly; and
a second washer positionable about the propeller shaft at a second location adjacent a second end of the bushing assembly so as to capture the bushing assembly between the first and second washers.

6. The propeller assembly of claim 1 wherein each key projecting radially inward from the inner surface of the insert disengages from the insert in response to a predetermined force thereon.

7. The propeller assembly of claim 1 wherein the propeller housing includes a plurality of circumferentially spaced propeller blades extending from the outer surface thereof.

8. A propeller assembly for mounting on a rotatable propeller shaft of a watercraft, the propeller shaft extending along an axis and terminating at a threaded end, comprising:
a central adaptor mountable on the propeller shaft for rotational movement therewith, the central adaptor defining an outer surface having a plurality of circumferentially spaced recesses therealong,
a generally tubular propeller housing slidable over the central adaptor, the propeller housing including an inner surface;
a bushing assembly for translating rotational movement of the central adaptor to the propeller housing, the bushing assembly including:
a bushing having an outer surface engaging the inner surface of the propeller housing and an inner surface having a plurality of circumferentially spaced recesses therealong; and
an insert having a plurality of circumferentially spaced keys projecting from an outer surface thereof into corresponding recesses in the inner surface of the bushing and a plurality of circumferentially spaced keys projecting from an inner surface of the insert into corresponding recesses in the outer surface of the central adaptor;
a first washer positionable about the propeller shaft and being interconnected to the propeller housing at a first location adjacent a first end of the bushing assembly; and
a second washer positionable about the propeller shaft at a second location adjacent a second end of the bushing assembly so as to capture the bushing assembly between the first and second washers.

9. The propeller assembly of claim 8 further comprising a locking element mountable on the propeller shaft for retaining the propeller assembly on the propeller shaft.

10. The propeller assembly of claim 9 wherein the central adaptor includes an enlarged head defining a cavity therein, the cavity receiving the locking element mounted on the propeller shaft therein.

11. The propeller assembly of claim 10 wherein the inner surface of the propeller housing includes a ledge therein, the second washer positioned between the ledge and the enlarged head of the central adaptor.

12. The propeller assembly of claim 8 wherein the propeller housing includes an outer surface having a plurality of circumferentially spaced propeller blades extending therefrom.

13. The propeller assembly of claim 8 wherein each key projecting from the inner surface of the insert breaks away from the insert in response to a predetermined force thereon so as to allow the central adaptor to rotate independent of the propeller housing.

14. A propeller assembly for mounting on a rotatable propeller shaft of a watercraft, the propeller shaft extending along an axis and terminating at a threaded end, comprising:
a central adaptor mountable on the propeller shaft for rotational movement therewith;
a generally tubular propeller housing slidable over the central adaptor, the propeller housing including an inner surface;
a bushing assembly for translating rotational movement of the central adaptor to the propeller housing, the bushing assembly including:
a bushing having an outer surface engaging the inner surface of the propeller housing and an inner surface; and
an insert having an outer surface operatively connected to the inner surface of the bushing and an inner surface of the insert; and
a breakaway element interconnecting the inner surface of the insert and the outer surface of the central adaptor, the breakaway element allowing the central adaptor to rotate independent of the propeller housing in response to a predetermined force on the breakaway element.

15. The propeller assembly of claim 14 further comprising a locking element mountable on the propeller shaft for retaining the propeller assembly on the propeller shaft.

16. The propeller assembly of claim 15 wherein the central adaptor includes an enlarged head defining a cavity therein, the cavity receiving the locking element mounted on the propeller shaft therein.

17. The propeller assembly of claim 16 wherein the inner surface of the propeller housing includes a ledge therein, and wherein the propeller assembly further comprises a washer positioned between the ledge and the enlarged head of the central adaptor.

18. The propeller assembly of claim 14 wherein the propeller housing includes an outer surface having a plurality of circumferentially spaced propeller blades extending therefrom.

19. The propeller assembly of claim 14 wherein the breakaway element includes a frangible key extending along the inner surface of the insert, the frangible key fracturing in response to a predetermined force thereon.

20. The propeller assembly of claim 19 wherein the central adaptor includes a recess in an outer surface thereof and wherein the frangible key extending along the inner surface of the insert extending into the recess.

* * * * *